United States Patent
Epstein

(10) Patent No.: US 7,980,463 B2
(45) Date of Patent: Jul. 19, 2011

(54) CASHIERS CHECK VERIFICATION SYSTEM

(76) Inventor: Howard C. Epstein, Dunn, NC (US)

( * ) Notice: Subject to any disclaimer, the term of this patent is extended or adjusted under 35 U.S.C. 154(b) by 430 days.

(21) Appl. No.: 12/169,167

(22) Filed: Jul. 8, 2008

(65) Prior Publication Data

US 2010/0006643 A1  Jan. 14, 2010

(51) Int. Cl.
G06Q 40/00 (2006.01)
G07D 11/00 (2006.01)
G07F 19/00 (2006.01)

(52) U.S. Cl. ............ 235/379; 235/375; 705/42; 705/43; 705/44; 705/45

(58) Field of Classification Search .................. 235/379, 235/375; 705/39–45
See application file for complete search history.

(56) References Cited

U.S. PATENT DOCUMENTS

| 4,408,121 | A | 10/1983 | Galatha |
| 4,658,126 | A | 4/1987 | May |
| 5,594,226 | A | 1/1997 | Steger |
| 5,925,865 | A | 7/1999 | Steger |
| 5,936,219 | A | 8/1999 | Yoshida et al. |
| 6,073,121 | A | 6/2000 | Ramzy |
| 6,129,273 | A | 10/2000 | Shah |
| 6,339,049 | B1 * | 1/2002 | Funahashi et al. ............ 508/100 |
| 6,464,134 | B1 | 10/2002 | Page |
| 6,493,680 | B2 | 12/2002 | Logan et al. |
| 6,808,109 | B2 | 10/2004 | Page |
| 7,201,323 | B2 | 4/2007 | Kotovich et al. |
| 2004/0006523 | A1 * | 1/2004 | Coker ............................ 705/35 |

OTHER PUBLICATIONS

Consumeraffairs.com, New Scam Uses Counterfeit Checks, consumeraffairs.com, Jun. 2, 2004, US.
Richard Alderman, Counterfeit Check Scam, CL&PBlog, Dec. 8, 2006, pp. 1-3, US, http://pubcit.typepad.com/clpblog/2006/12/counterfeit_che.html.
Wikipedia.com, Cashier's Check, Aug. 30, 2007, US, http://en.wikipedia.orglwiki/Cashiers_check.
Wikipedia.com, Image:CommunityBankCheck.gif, Feb. 9, 2006, US, http://en.wikipedia.org/wiki/Image:CommunityBankCheck.gif.

* cited by examiner

Primary Examiner — Thien M. Le
Assistant Examiner — Tuyen K Vo
(74) Attorney, Agent, or Firm — Jim Passé; Passé Intellectual Property, LLC

(57) ABSTRACT

The present invention discloses a method and system for the verification of a cashier's check. The method and system involves a verification machine-readable code that can be verified online for authenticity and status. It can further be used to authorize payment.

8 Claims, 3 Drawing Sheets

CASHIERS CHECK VERIFICATION SYSTEM

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

1. Field of the Invention

The present invention relates to a method of cashier check verification. In particular the present invention relates to a method of verifying that a cashier's check is authentic and has not yet been cashed to prevent multiple copies of an authorized cashier's check or unauthorized cashier's checks from being cashed. It further provides a method of authorizing payment on the cashier's check.

2. Description of Related Art

Check fraud is accelerating as a world-wide problem with over $10 billion lost to fraud in the US alone. It appears that in excess of 1 million worthless checks enter the banking system daily and as technology advances, so does the sophistication of the criminal in the banking industry. Accordingly, the amount that fraudulent checks are being written for is increasingly over more than $100,000. Money orders, personal checks and the like are particularly susceptible to fraud and so merchants and individuals frequently request cashier's checks as payment for products and services.

A cashier's check is a check guaranteed by a bank for the payment of the check. They are frequently treated as cash and many banks will clear the check immediately without checking for the validity of the cashier's check until after it has paid on the check. Cashier's checks, generally, are also produced with security features including watermarks, security threads like currency, color shifting ink and special paper. All these features are designed to decrease the ability to copy or counterfeit the cashier's check. The checks are usually signed by an officer of the bank with the power to bind the bank to payment.

In spite of the increased safety of a cashier's check, their increasing use has led to various scams and counterfeiting schemes involving cashier's checks. Typically, a counterfeit cashier's check is given to someone in an amount more than owed and the recipient is expected to return the difference in cash only to find out later that the original check was fraudulent. When a fraudulent check is paid, even if it appeared to be a legitimate cashier's check the individual cashing it has to pay back the entire amount leaving him out the money sent to the counterfeiter. Other schemes involve copying of legitimate cashier's checks and cashing multiple versions of the same check before the issuing bank actually clears the original check or modifying the amount of a an issued cashier's check. Since banks prefer to pay on the cashier's check immediately upon presentment, it is not infrequent that the bank charges back the client recipient when the check is discovered to be a forgery or that a bank or other institution loses money in the transaction.

Many different types of forgery prevention have been tried though never very successfully with cashier's checks. In U.S. Pat. No. 5,925,865 issued Jul. 20, 1999 to Steger there is described an apparatus for automatically accessing and verifying checking account status based on information contained in a bar code printed on a check, travelers check or money order. The information can be transmitted to a bank for clearance but the immediate means of preventing the fraud is not disclosed.

In U.S. Pat. No. 5,936,219 issued Aug. 10, 1999 to Yoshida et. al., there is disclosed a computer based (not internet) electronic payment system in which a payer's check issuing computer issues an electronic check having a check identifier and an issue time where the check identifier includes a payer identifier for uniquely identifying a payment. The system is designed for clearing checks internally and not for interbank transactions nor for simple merchant inquiries.

In U.S. Pat. No. 6,808,109 issued Oct. 26, 2004 to Page there is disclosed a system and method for verifying the authenticity and payment of a check at any of a plurality of banks or check cashing sites, wherein a payor or issuing site determines a first set of data including account and individualized payee data, which is communicated to a processing center for temporary storage and eventual comparison. The check can eventually be redeemed authorized or refused.

In U.S. Pat. No. 6,073,121 issued Jun. 6, 2000 to Ramzy there is disclosed a method which improves check fraud prevention systems both in printing and verifying In U.S. Pat. No. 7,201,323 issued Apr. 10, 2007 to Kotovich et al., there is disclosed a system and method for validating the authenticity of a signature on a document, such as a check, by providing a document from an account, the document including an actual signature and a machine-readable identifier wherein the machine-readable identifier contains a string of data representing the integral characteristics of all valid account signatures and a person-specific confidence threshold.

Accordingly, it would be useful to have a method or system to allow users of cashier's checks to verify and cancel checks and to allow users in the public domain to verify the validity of a given cashier's check.

SUMMARY OF THE INVENTION

It has been discovered that a cashier's check verification system with machine readable information can be controlled by having an internet based system that verifies and cancels checks. It further allows anyone to check and see if a check has actually been issued to a given payee. Further, it allows banks and other institutions to immediately cancel a verified and cashed check rather than waiting for the check to clear in the normal course of business.

An internet based system for verifying the authenticity and status of a cashier's check issued by a banking institution comprising:
  a) a system for the banking institution to send a first set of data regarding the cashier's check to a server for issuance of a machine readable code;
  b) a server for issuing machine readable code regarding the first set of data to the banking institution wherein the sever maintains information to verify the authenticity and status of a cashier's check to be issued by the banking institution;
  c) a system for securely placing the machine readable code on the cashier's check;
  d) an internet based web site in communication with the server;
  e) a system for reading the machine readable code and sending it to the web site, wherein the web site communicates with the server and the server verifies one or more of the authenticity and status of the check based on the code; and f) a system for modifying the status of the check on the server.

In yet another embodiment of the invention there is disclosed a method for preventing check fraud with a cashier's check issued by a banking institution comprising:
- a) the banking institution sending information about the cashier's check to a server;
- b) the server issuing a machine readable code regarding the information and logging the check as authentic and unpaid; and
- c) imprinting the machine-only readable code on the issued cashier's check.

In a method which includes the above method another embodiment includes the further steps of providing a means for verifying the authenticity or status of the cashier's check comprising:
- a) providing a means to read the machine readable code and transmit it to a web site;
- b) the web site communicating with the server regarding the machine readable code;
- c) the server comparing the machine readable code and the logged information about the check and reporting the result back to the web site.

In yet another embodiment of the invention there is a web site for verifying the validity and status of a cashier's check issued by a banking institution comprising:
- a) a means for accepting and storing a first set of data regarding the authenticity and status of the cashier's check from the banking institution; and
- b) a means for responding to inquiries from an entity about the authenticity or status of a selected cashier's check by comparing the first set of data with the data from the selected cashier's check and reporting the result of the comparison to the inquiring entity; and
- c) a means to change the status of an active check to inactive when the cashier's check is cashed.

These and other objects of the present invention will be clear when taken in view of the detailed specification and disclosure in conjunction with the appended figures.

DETAILED DESCRIPTION OF THE INVENTION

Figure 1:
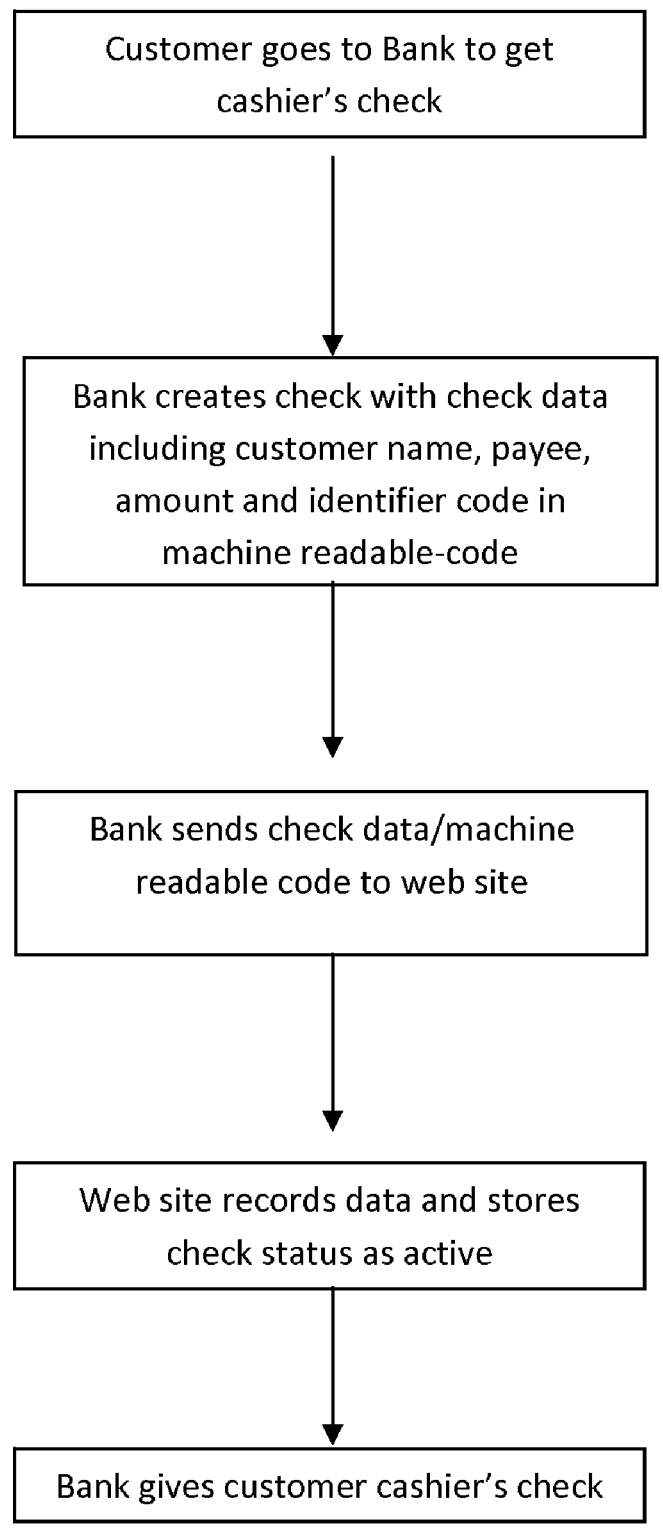
FIG. 1 is a flow chart of the process of a customer getting a check with the present invention.

It has been an ever increasing problem that cashier's checks are being forged and cashed by unsuspecting individuals who eventually have to pay back the money paid by the cashing organization. This has been true since banks cash forged checks and only later learn of their try authenticity and status. It has been discovered that because of the unique nature of the cashier's check in which a payee appears on the check when issued that the present invention involving an independent web site that acts to immediately verify and create an active/inactive status for the check especially at the point of cashing the check that fraud can be greatly reduced in the handling and cashing of cashier's checks.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

The terms "a" or "an", as used herein, are defined as one as or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "and an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

As used herein the phrase "verifying the authenticity and status of a cashier's check" refers to the process of the present invention when an intermediary web site records specific data from an issuing bank regarding the check and certain information about the parties to the transaction and creates an active status for the check when created and inactive status when cashed. The verifying process is done at the point of issuance and at the point of cashing the check in order to prevent cashing a check which later turns out to be a fraud entirely or a fraudulent copy of a legitimate cashier's check.

Machine-only readable code refers to placement of the front or back of the check when it is issued of a code which can be read by machines. The code in addition to the drawing bank, identifier and the like can also include the drawer and the payee. Various types of machine readable code are available to encrypt safely the information desired into such code. Bar codes were at one time very popular but now various more sophisticated forms of machine-readable code are available, and in one embodiment, the machine-readable code is not a bar code identifier. The machine-readable code can also contain any other data required by the system and can even contain graphic images such as a photograph of the drawer, a fingerprint of the drawer and the like. Various means of placing such a machine-readable code on a check and one skilled in the art would be able to pick the appropriate method. The issuing banking institution, the drawee bank, will use information about the check as well as a secret identifier number decided on by someone involved in the system of the present invention, randomly or as desired. Other data including the payor and the amount of the check are important. One of the most beneficial elements of the present invention is, since cashier's checks have the payee filled in at issuance, to record on the machine code the payee thus insuring that only the appropriately named payee can cash the cashier's check, unlike other types of checks, which even if they are registered in some form of authentication system, cannot verify an authentic payee.

A particular embodiment of the present invention involves a web based internet site for receiving and storing the data received from the bank via the machine code. The web site acts to verify the information when the check is presented keeping the data available. So, when the check is presented for cashing, the machine-readable code on the check that is presented can be compared with the information on the stored data for the check. The comparison can determine things, such as is the check genuine, is the data on the machine-readable code still the same information as when the check was issued, what is the status of the check, i.e. is it still active or has it already been cashed indicating the presented check is a forgery. In addition to information designed at the point of cashing to determine if a valid check has been issued, one armed with the machine-readable code can use that information to verify that the check is authentic. One again readers of machine-readable code are ubiquitous and can easily be used in this expanded manner thus allowing anyone receiving a check to verify authenticity.

The machine readable code as mentioned can be sent to the website by any convenient means. After being read by a scanner the code can be sent digitally to the internet and to the web site where a server or other computer can process the information on the check machine readable code and compare it with the stored data on the web site data base.

When a third party is ready to cash the check (although a "third party" could, of course, be the drawee bank), the third party can read the code and send it to the web site for verification. The web site can be a secured site wherein only parties with access information can access the information or can be an open web site wherein anyone transmitting the machine code to the site can view the information on the check. It could also be a combination of these types where some information is open to the public and other information is only available to authorized individuals or institutions.

Once the third party has accessed the web site in order to determine if the check is authentic as written and is prepared to cash the check, the third party can indicate to the web site that the check is being cashed. The website then changes the stored data on the check, changing the status from issued and active to cashed and inactive, thus preventing copies of the check from being presented at other institutions at other times.

Now referring to the drawings, FIG. 1 is a flow diagram of the creation of the cashier's check of the present invention with the machine-readable code. A customer, i.e. an individual or group that wishes to get a cashier's check, goes to a bank using the present invention system and method. The bank requests the normal information from the customer required to produce a cashier's check, such as the customer's name, the Next, the bank sends all the data, including the identifier code, to the independent web site on the internet. This can be done by sending the data directly or transmitting the particular machine code to the web site over the internet. In an alternate embodiment the Bank sends the data to the web site only and the web site generates the machine-readable code, the identification code or both for imprinting on the check at the banking facility. Regardless, the web site records the check data and associates the web data with the particular identification code for later comparison of the code. The check is then assigned a status such as un-cashed or active so that inquiries will indicate that there is indeed still an active check associated with the particular identifier code.

At the point that the web site has completed the recording of the data and assignment of status, the website would indicate to the Bank that the check is now in active status. The bank can then give the cashier's check to the customer to deliver to the payee knowing that the check can be cashed by the payee without fear of the check being a forgery and that the check will be active at the time of the presentation of the check to a cashing entity.

Figure 2:
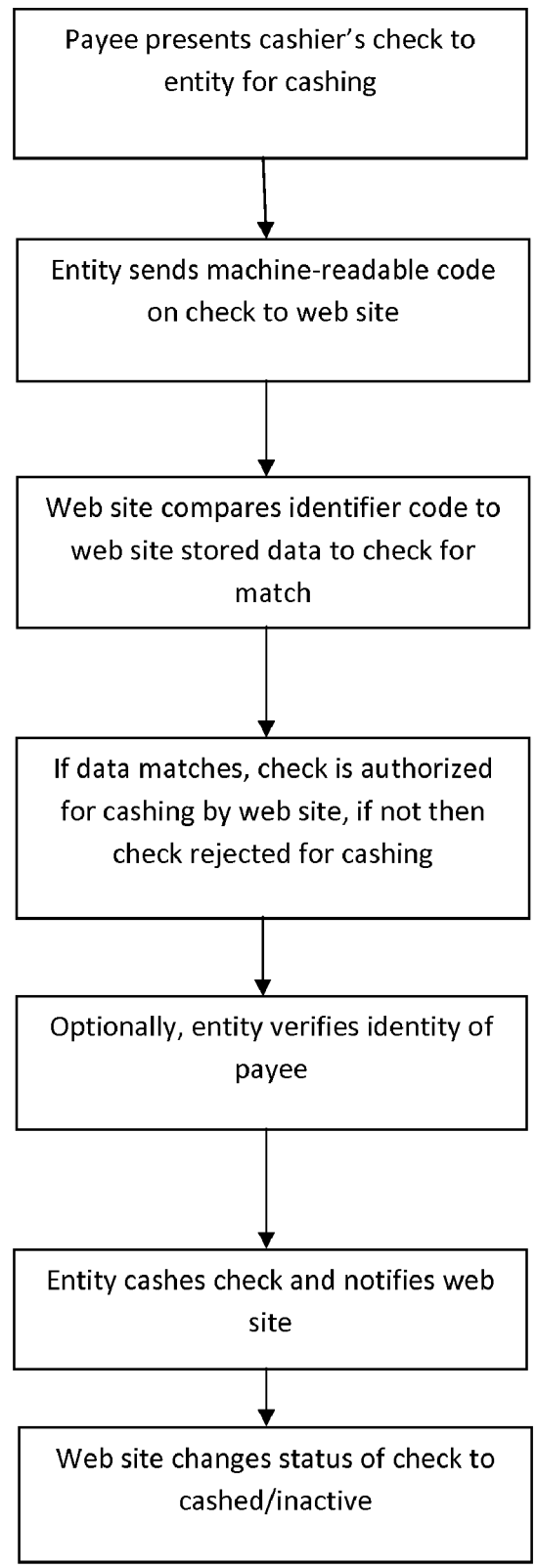
FIG. 2 is a flow chart of the presentment of a cashier's check for cashing and the process of verification.

FIG. 2 is a flow chart of the process of presenting a check for payment, verification and cancellation as an active cashier's check. The payee indicated on the cashier's check takes the bank to an entity that will cash the check and is participating in the present invention system and method. The entity can be the payee's bank or can be any entity that normally would cash a check of this kind, such as a retail business or the like. The entity then sends the machine-readable code to the web site on the internet. This can be done by placing the check in a reader for scanning the check or can be a simple scan produced by a scanner or a reader specifically designed for reading the machine-readable code and nothing else. The code is converted into a digital form from the printed form on the check and then the digital form of the machine-readable code is transmitted over the internet to the internet web site handling the check verification and authorization. The data on the code is matched against the data and identifier code in the web site information collection. If the data and code match, then the web site checks to see if the check is still active or un-cashed. If the check is thus authenticated and verified for cashing, the cashing entity can then indicate to the web site that the check is being cashed. The web site would then change the status of the check from active and un-cashed to inactive and cashed. The cashier's check would then be cashed by the entity with the payee knowing that the check would not later come back as a forgery. As an optional step in the present invention, one embodiment of the invention would be for the cashing entity to verify the identity of the payee to further prevent fraud by helping prevent the cashing of a legitimate authorized check by someone who had obtained the check illegally, for example, by theft.

The system also has the ability to answer inquiries to the system to check if the check is legitimate without actually cashing the check. This might be useful when the recipient of the bank is taking payment not as a merchant but as an individual selling something not in the regular course of business. The recipient would then know that the check at the time of receipt is a legitimate check and not a forgery. The individual would still need to wait till presentment of the check to the ultimate cashing entity with the power or authority to indicate that the check is being cashed in order to know that the check is still active when finally removed from the system. Accordingly, the system could, in yet another embodiment of the invention, allow for modification of the information in the data base. So, for example, if the check was stolen during the process, the web site could be contacted by an authorized individual and the status of the check changed to inactive, stolen or the like, so that if the check is illegally resented for cashing, the person cashing entity would know not to cash the check instantly.

Figure 3:
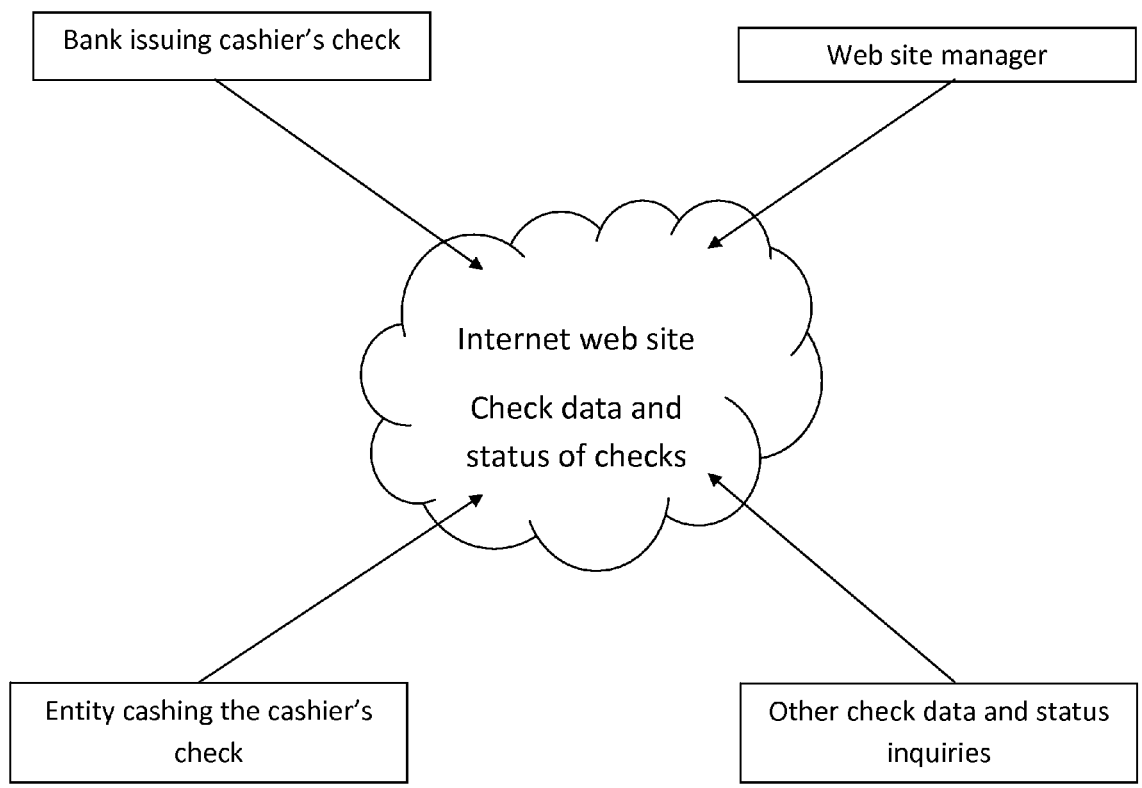
FIG. 3 is a flow diagram of the access to the web site of the present invention.

FIG. 3 is a flow diagram of the access to the internet web site of the invention. As we can see, there are four basic accesses to the internet web site of the present invention. The first is the bank issuing the cashier's check. This, as noted earlier, is the standard bank that issues a cashier's check and is participating in the system and method of the present invention. Next is the entity cashing the cashier's check. This would be another bank but could also be a retail establishment or the like or possibly even an individual. Next, it is possible to allow inquiries to the system An inquiry would not be to cash the cashier's check, rather an inquiry would be merely to check on the authenticity and status of the check at the particular moment the inquiry is made. Lastly, the web site manager would be able to continue to program and update the web site and have access to the secured data on the web site.

What is claimed is:

1. An internet based system for verifying the authenticity and status of a cashier's check issued by a banking institution and preventing identical copies of the cashier's check from being cashed comprising:
   a) the internet based web site comprising:
      i. a means for generating a check identifier code for the cashier's check;
      ii. a means for generating a machine-only readable code comprising a first set of data regarding a payor, a payee, an amount of the cashier's check and the check identifier code wherein the machine-only readable code is different from any machine-only readable code placed on the check by the banking institution;
      iii. a means for delivering the machine-only readable code to the banking institution for placement on the cashier's check;
      iv. a means for storing the first set of data and the status of the check wherein the check initially has an active status;
      v. a means for receiving machine-only readable code on a selected cashier's check containing a second set of data and comparing the second set to the stored first set and determine if the second set is identical or not to the first set;
      vi. a means for reporting the result of the comparison and the current check status when the second set is identical to the first set; and
      vii. a means for changing the active status to inactive when the comparison determines the second set is identical to the first set and the check is to be cashed;
   b) a means for the issuing banking institution to place the machine-only readable code first data received from the web site on the cashier's check; and
   c) a means to send machine-only readable code containing a second set of data on a cashier's check to the internet based web site for comparison to the first set of data.

2. A system according to claim 1 wherein the system further comprises a means for verifying the identity of the person cashing the check is the payee indicated in the first set of data.

3. A system according to claim 1 wherein access to the web site is by authorization means.

4. A method for preventing the cashing of multiple copies of a cashier's check issued by a banking institution using a web site based system comprising:
   a) sending information from the banking institution to the web site about the cashier's check consisting of a payor, a payee and an amount of the check;
   b) the web site issuing a check identification number for the check;
   c) the website creating a first set of data comprising the payor, the payee, the amount of the check and the check identification number and storing the first set of data as having an active status;
   d) the website creating a machine-only readable code of the first set of data separate from any machine-only readable code already on the cashier's check and sending the machine-only readable code of the first set of data to the banking institution;
   e) the banking institution placing the machine-only readable code on the cashier's check; and
   f) providing a means for the web site to receive machine-only readable code that has been placed on a cashier's check as a second set of data from an entity trying to determine the status of the check and compare the second set to the first set and determine if the second set is identical or not to the first set;
   g) reporting the results of the comparison and the status of the check to the entity; and
   h) changing the check status to inactive when the first set is identical to the second set and when the entity indicates to the web site that the check is being cashed.

5. A method according to claim 4 wherein the method further comprises verifying the identity of the payee.

6. A method according to claim 4 wherein there is a method of authorizing access to the web site.

7. A method according to claim 4 wherein the comparison is reported without changing the status of the check.

8. A web site for verifying the authenticity and status of a cashier's check issued by a banking institution and preventing identical copies of the cashier's check from being cashed the web site comprising:
   a) a means for generating a check identifier code for the cashier's check;
   b) a means for generating a machine-only readable code comprising a first set of data regarding a payor, a payee, an amount of the cashier's check and the check identifier code wherein the machine-only readable code is different from any machine-only readable code placed on the check by the banking institution;
   c) a means for delivering the machine-only readable code to the banking institution for placement on the cashier's check;
   d) a means for storing the first set of data and the status of the check wherein the check initially has an active status;
   e) a means for receiving machine-only readable code on a selected cashier's check containing a second set of data in machine-only readable code and comparing the second set to the stored first set and determine if the second set is identical or not to the first set;
   f) a means for reporting the result of the comparison and a current check status when the second set is identical to the first set; and
   g) a means for changing the active status to inactive when the comparison determines the second set is identical to the first set and the check is to be cashed.

* * * * *